May 7, 1935.  U. TEXIER DE LA CAILLERIE  2,000,827
LAND AND WATER MOTOR VEHICLE
Filed April 20, 1933   2 Sheets-Sheet 1
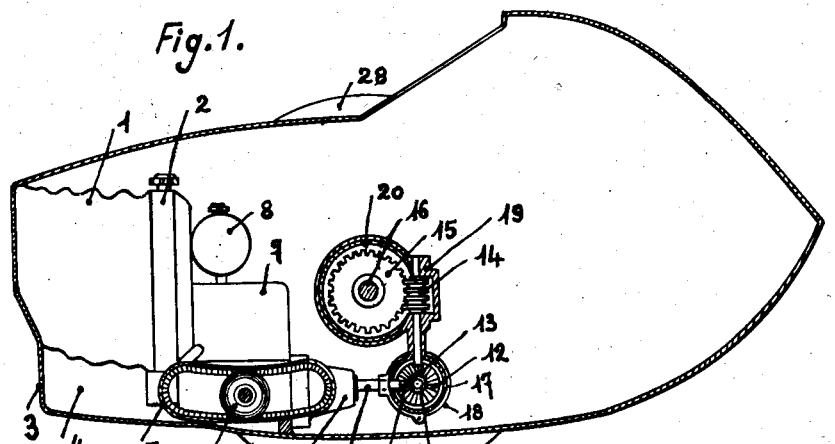
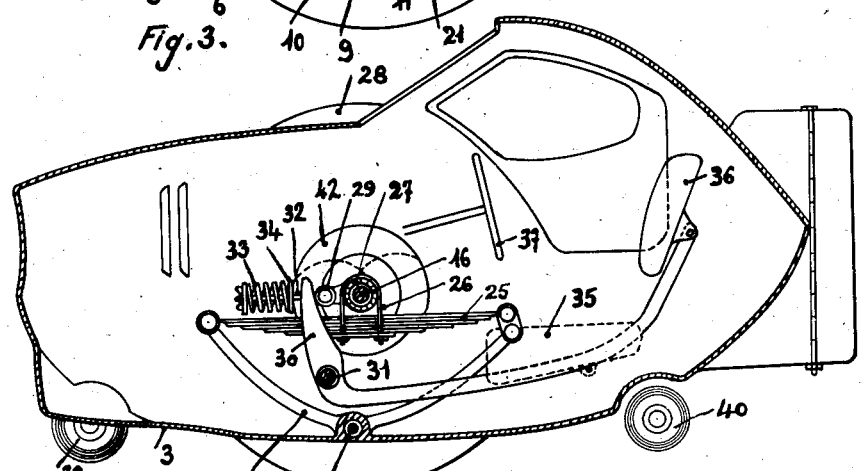
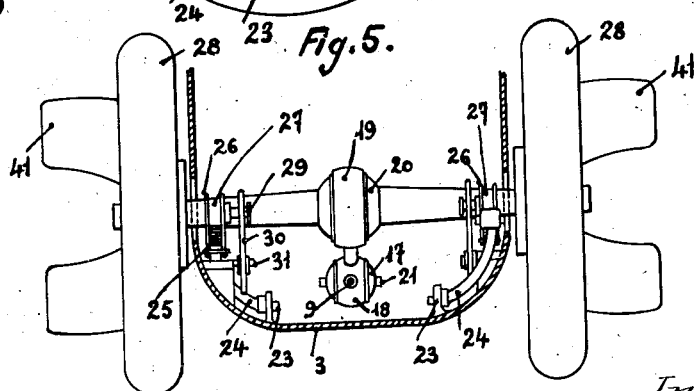
Inventor
Ulysse T. de la Caillerie,
By William C. Linton
Attorney.

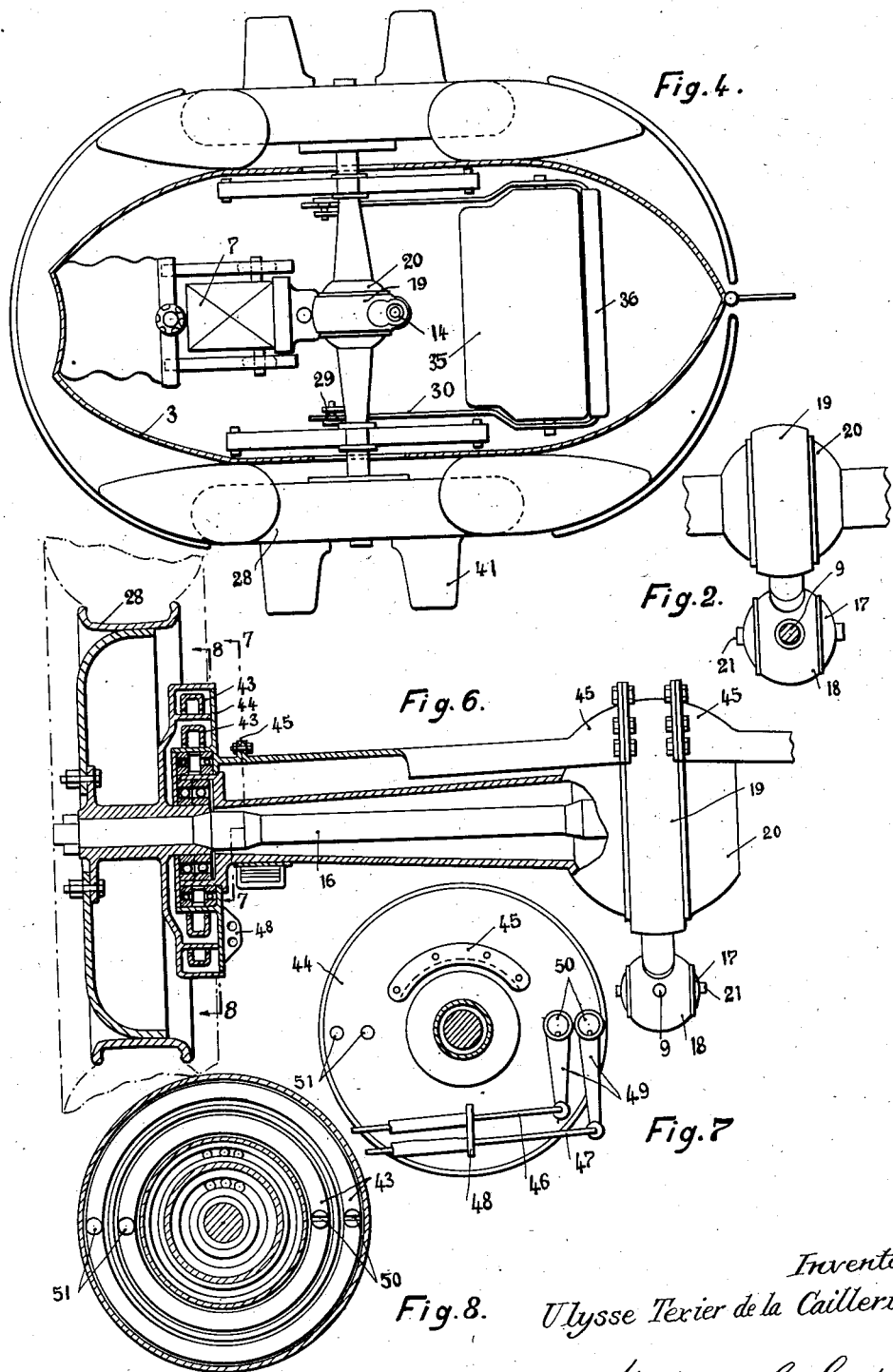

Patented May 7, 1935

2,000,827

UNITED STATES PATENT OFFICE 2,000,827

LAND AND WATER MOTOR VEHICLE

Ulysse Texier de la Caillerie, Secondigny-En-Gatine, France

Application April 20, 1933, Serial No. 667,120
In France April 20, 1932

7 Claims. (Cl. 115—1)

The present invention has for its object a compound motor vehicle which will operate either on ground or on water.

A characteristic of this vehicle is that it has only two wheels set on a single axle mounted at the centre of gravity of the apparatus, the equilibrium of which is maintained while running on the ground by means of an automatic balance of load distribution and with an automatic stabilizer.

A trial apparatus of 2000 lbs. weight built by the applicant and driven by a 5 horsepower gasoline engine made a number of successful demonstrations on ground and also on ponds and rivers; it launches upon the surface of water whatever the depth may be and comes out easily; on ground it runs quickly, turns about in its own length, and maintains perfectly its equilibrium on its two large wheels positioned at the centre of gravity of the apparatus. It is provided with two protecting rollers at its ends, however, these rollers do not touch the surface of the ground while running and are only used for the protection of the hull or body while launching onto water and coming out of water.

The accompanying drawings show as an example a form of practical embodiment of the invention.

Fig. 1 is a view in elevation of the apparatus on which an axial longitudinal section is provided in order to show the driving and stabilizing members.

Fig. 2 is a detail of the differential gear of the bearing bridge of the apparatus.

Fig. 3 shows in elevation a longitudinal sectional view of the details of the suspension device.

Fig. 4 is a plan view of the apparatus.

Fig. 5 is a transverse view showing the details of the suspension device.

Fig. 6 is a transverse section showing the arrangement of the braking and steering drums of the bearing plates for the braking and steering shoes, connected by braces to the stabilizing system.

Fig. 7 is a sectional view taken on the line 7—7 of Fig. 6 looking in the direction indicated by the arrows.

Fig. 8 is a sectional view taken on the line 8—8 of Fig. 6 looking in the direction indicated by the arrows.

As shown in Fig. 1, the apparatus includes the air piping bellows 1 providing for cooling of the radiator 2 which is positioned on the fore part of a water-tight body 3 having cylindrical or ovoid shape and acting as a hull. Under the bellows is provided a space 4 to allow the forward motion of the motor members during the operation of stabilization. Under the frame of the body are fixed two open or shut sliding rails 5 with a semi-circular shape which act as guides for two rubber tired rollers 6 bearing the whole weight of the engine 7 with its members. On the engine 7 is fixed the gasoline tank 8.

The outer shaft 9 of the gear shift box 10 comes into engagement by a conical pinion or worm 11 or a chain with the rim gear wheel 12 which in turn drives a pinion 13 carried by a worm shaft or by an angle pinion 14 in engagement with a rim gear wheel 15 which drives through a differential gear the shaft 16 of the wheels of the vehicle. The pinions 11 and 13 together with the rim gear whel 12 rotate in a housing 17 which in turn is enclosed in an outer casing 18 provided with an aperture and cover therefor allowing angular opening during the forward or backward displacement of the engine 7 on the sliding rails 5. The internal housing 17 is jointed to a cupola 19 movable around the central casing 20 of the bearing bridge. The intermediary rim gear 12 is carried by a shaft 21 supported from the outer casing 18.

The assembly of the body is shown in detail in Fig. 2. The body is suspended at two movable points or fixed brackets 23 on two supporting balancing elements 24 the ends of which are connected to the laminated springs 25 which are attached to the stirrups 26 and trumpet-tubes 27 of the bearing bridge on which is carried the driving shaft 16 of the wheels 28. The rollers 29 carried by the trumpet-tubes 27 are used as stops at the ends of two levers for the displacement of the centre of gravity 30 and articulated around the axes 31 which are jointed to the body. On the trumpet-tubes 27 are fixed two adjustable rods 32 stopped by the springs 33 on the fittings 34 which are carried by the body. The levers 30 bear the seat for the passengers 35 together with the back 36.

The body includes one or two small rubber tired front wheels 39 and a small back wheel 40. The one or more small wheels 39 support the apparatus when it is stopped or running idle, and are used to protect the hull or body; they facilitate also launching into and hauling out of the water or liquid element.

The driving wheels 28 are provided with side propulsive wings 41 as shown in Figs. 4 and 5.

In the body are the openings 42 allowing the bearing bridge to be displaced; the openings are provided with a flexible leather cover specially shaped so as to make the body water-tight when the apparatus is running in water.

The operation of the apparatus is performed in the following manner:

The frame of the body 3 is suspended on the lower axes 23 and held in its normal position by the ends of the levers 30 which bear against the rollers 29 of the bearing bridge. The tension of the springs 33 in relation to the fitting 34 of the frame restores the bearing bridge and also the rollers 29 which operate the levers 30 and maintain their longer arm in horizontal position. It will be easily understood that under the influence of the changing load of the passengers on the seat 35, the levers 30 react on their pivots 31 and rollers 29, and since pivot 31 is fixed to the body it applies a force against suspension point 23 of the frame whereas the roller 29 applies a force against the bearing bridge. Such opposed forces result in displacing the centre of gravity of the whole apparatus. This displacement is determined on the one hand by the passenger load and on the other hand by the resiliency of the restoring springs 33. Careful tests show that with an apparatus of 2000 lbs. weight, a displacement of about two to four inches is sufficient to maintain the horizontal equilibrium of the apparatus under a weight variation of 220–440 lbs.

Together with the automatic and load distributing balancer above described, the vehicle is provided with an automatic stabilizer the operation of which is as follows:

The engine being put in gear, the small pinion 11 transmits power to the worm 14 by means of the rim gear wheel 12 and pinion 13. The rim gear wheel 15 is thus driven and therefore also the wheels 28 of the vehicle.

If the torque applied between body and axle due to ground resistance such as braking resistance exceeds the torque applied by the driving action of the engine, the resultant is applied in the reverse direction, that is on the part offering the lesser resistance. There is simultaneously a disturbance of equilibrium on the horizontal plane of the apparatus, and at this moment since the cupola 119 is movable on the internal housing 20 and is also jointed to the lower casing 17, the casing 17 is pushed forwards carrying with it the engine 7 running on its rollers 6 on the sliding rails 5. This movement is more or less rapid according to the resistance of the wheels on the ground on the one hand, and on the other hand according to the torque applied by the motor.

This device is designed to adjust automatically the tendencies towards instability of the running apparatus owing to the reactions caused by the variations of the surface resistance and of the motor torque.

When the apparatus is stopped, the whole of the motor weight is on the dead point on the axis of the sliding rails 5 and, the engine can be displaced in the forward or backward direction only for a distance of about 8 up to 12 inches, according to the weight of the motor members, the stabilizing system being adjusted in a definite manner during its manufacture.

The engine contributes by its own weight to the automatic adjustment of the centre of gravity and to maintaining horizontal equilibrium of the running apparatus on grades of from 30 up to 40% whatever the reactions may be.

The apparatus is provided with two wheels of substantial size and having a rugged construction can easily travel through uneven lands, such as ploughed lands, sands, downs, and also over water carriers, also in marshy grounds without any transformation or adjustment for operation.

The manner of the transmission of power and the displacement of the centre of gravity reduces substantially the sliding of the wheels on the soil of bad lands.

The steering of the vehicle is secured by the steering wheel 37 carried by a tube in the usual way, this tube bearing at its lower part a square shaped fitting or a case including a rack fixed to the bearing bridge, and the ends of this rack are provided with ball joints or axes attached to the metal cables placed under flexible sheaths 46, 47, Fig. 6, which work by the sheath buffer 48 on the small levers 49 of the cams or expanding means 50 of the brake shoes 43 which are jointed to the axes 51 fixed to the plates 44 connected by the braces 45 to the cupola 19 of the stabilizing system. It will be easily understood that when braking either by the hand lever or the foot pedal, the wheels, by means of the brake shoes 43 and the supporting axes of the shoes 51, will move the movable plates 44 about the ends of the trumpet-tubes of the bearing bridge. The purpose of this is to adjust the centre of gravity of the apparatus, in accordance with variations in surface resistance caused by braking, using the engine weight as a stabilizer of the whole. Such braking stabilizes automatically and in a steady manner the equilibrium of the vehicle. This obtains for the braking caused by the steering of the apparatus and which is operated with a facility unknown in any other vehicle.

The left turning of the steering wheel brakes the left wheel and turns the vehicle to the left, and vice versa. The apparatus tends to straighten out its direction of movement even when the steering wheel is not under any control at all, owing to its own inertia, and to the differential gear.

The braking is secured by a hand lever and a foot pedal controlling through the medium of metal cables placed in sheaths and connecting the small levers of the cams or expanding means of the above described brake shoes.

The release of the engine is secured by a steel cable under the flexible sheath connected to a pedal, and it is the same for the accelerator.

The apparatus floats on water safely owing to the perfect water tightness of its body. The steering on water is obtained by braking one of the wheels and the forward motion is produced by wings. The apparatus turns in its own length on water or on land.

The weight of the tires is substantially reduced, and the power required is about a half of that required for the vehicles heretofore known. Furthermore it is practically impossible to upset the apparatus.

This apparatus has many possible applications. It can be used for light conveyance on ground and water farm tractor marine vehicle, colonial vehicle for officials, either autoamphibian or not, compressor, either amphibious or not, tank, etc.

It is understood that the details of the described vehicle may be modified in every manner suitable to the realization of the invention.

In an embodiment of this invention, it is possible to employ two metal casings in the form of ovoid shells one inside the other, the outer casing being propulsive and the other casing including the machinery and the passengers according to an arrangement similar to the above description. In such an embodiment, the axial parts are disengaged, and steering is obtained by throwing the coupling mechanism out of gear.

Having now described the object of this invention and in which manner same is to be performed, what I claim is:

1. In a vehicle normally running on two wheels, a body, a load carrying member in said body, a lever pivotally mounted on said body and carrying said load carrying member, a main drive axle resiliently and pivotally mounted on said body, bearing means for applying pressure to said axle, said lever being mounted to apply pressure on said bearing means, and resilient means opposing the relative motion of said body and said axle due to the load actuated pressure applied by said lever, whereby changes in load applied to said load carrying member automatically cause changes in the relative position of said body and said axle which increase the stability of said vehicle.

2. In a vehicle normally running on two wheels, a body, a load carrying member in said body, a lever pivotally mounted on said body and carrying said load carrying member, a main drive axle resiliently and pivotally mounted on said body, bearing means for applying pressure to said axle, said lever being mounted to apply pressure on said bearing means, resilient means opposing the relative motion of said body and said axle due to load actuated pressure applied by said lever; a system of sliding ways mounted on said body, an engine slidably mounted on said ways, a transmission housing mounted on said axle, and adjustable means connecting said transmission housing and said engine, whereby the stability of said vehicle is increased.

3. In an amphibian vehicle normally running on two wheels, a water-tight body, a load carrying member in said body, a lever pivotally mounted on said body and carrying said load carrying member, a main drive axle resiliently and pivotally mounted on said body, a pair of wheels carried by said main drive axle and provided with water propulsive means, bearing means for applying pressure to said axle, said lever being mounted to apply pressure on said bearing means, and resilient means opposing the relative motion of said body and said axle due to load actuated pressure applied by said lever, whereby changes in load applied to said load carrying member automatically cause changes in the relative position of said body and said axle which increase the stability of said vehicle.

4. In an amphibian vehicle normally running on two wheels, a water-tight body, a load carrying member in said body, a lever pivotally mounted on said body and carrying said load carrying member, a main drive axle resilently and pivotally mounted on said body, a pair of wheels carried by said main drive axle and provided with water propulsive means, bearing means for applying pressure to said axle, said lever being mounted to apply pressure on said bearing means, resilient means opposing the relative motion of said body and said axle due to load actuated pressure applied by said lever, a system of sliding ways mounted on said body, an engine slidably mounted on said ways, a transmission housing mounted on said axle, and adjustable means connecting said transmission housing and said engine, whereby the stability of said vehicle is increased.

5. In a vehicle normally running on two wheels, an engine, a main drive axle, a body, a stabilizer unit comprising an articulated mechanical transmission system, and means for applying to said transmission system inertia forces due to the weight of said engine in opposed relation to the forces due to the braking and steering of said vehicle, and load distributing means for applying between said axle and said body a turning moment determined by the load carried by said vehicle.

6. In a vehicle normally running on two wheels, an engine, a main drive axle, a body, a bearing bridge, an automatic stabilizer unit comprising a curved rolling way for movement of said engine thereon, a coupling between said engine and said bearing bridge comprising two mutually perpendicular auxiliary axles and comprising bevel gears carried by said auxiliary axles, said gears being disposed in two concentric cases mounted to swivel, said casings being slotted to permit relative motion of said auxiliary axles when the engine is displaced on said way, the exterior one of said casings being movable along a horizontal axis and the interior one of said casings being movable along a vertical axis, a worm on said vertical axis, a differential engaging said worm to control the wheels of said vehicle, a second set of concentric casings enclosing said differential and worm to permit said worm to follow the relative angular movements of said auxiliary axles, and connecting means for the exterior one of said second set of casings forming a cupola for the steering and braking members of said vehicle, whereby the reactions caused by steering and braking of said vehicle in motion apply stabilizing forces thereto.

7. In a vehicle normally running on two wheels, an engine, a main drive axle, a bearing bridge, a body carried on said bearing bridge, an automatic stabilizer unit comprising an articulated mechanical transmission system and means for applying to said transmission system inertia forces due to the weight of said engine in opposed relation to the forces due to the braking and steering of said vehicle, and a passenger load distributing unit comprising a seat, a lever member pivotally mounted on said body and carrying said seat, roller means mounted on said bearing bridge and resiliently mounted on said body, whereby changes in the passenger load cause corresponding changes in the position of the center of gravity of said vehicle which tend to increase the stability thereof.

ULYSSE TEXIER DE LA CAILLERIE.